June 14, 1927.
L. J. KALVIG
POULTRY ROOST
Filed Dec. 9, 1925
1,632,234
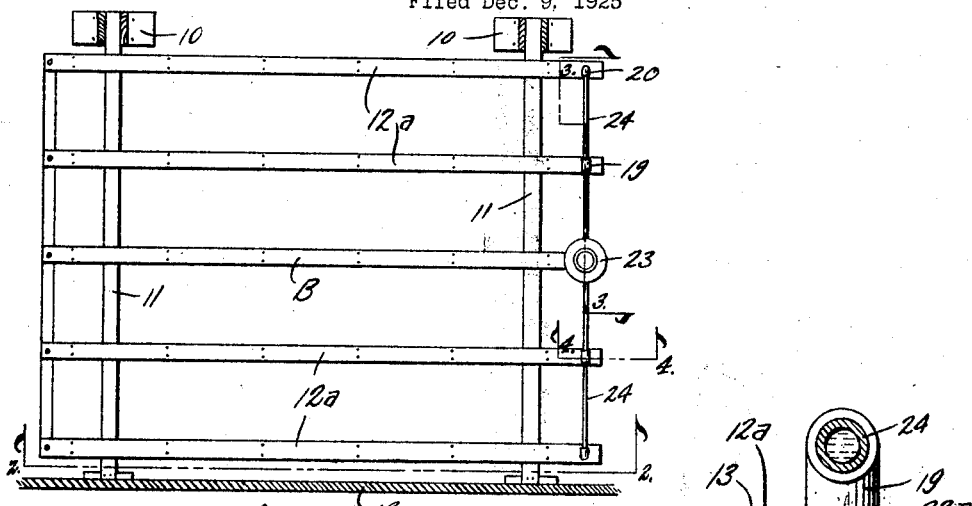
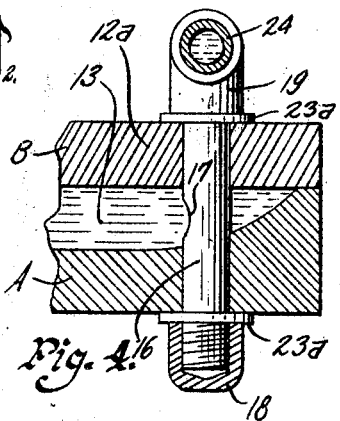
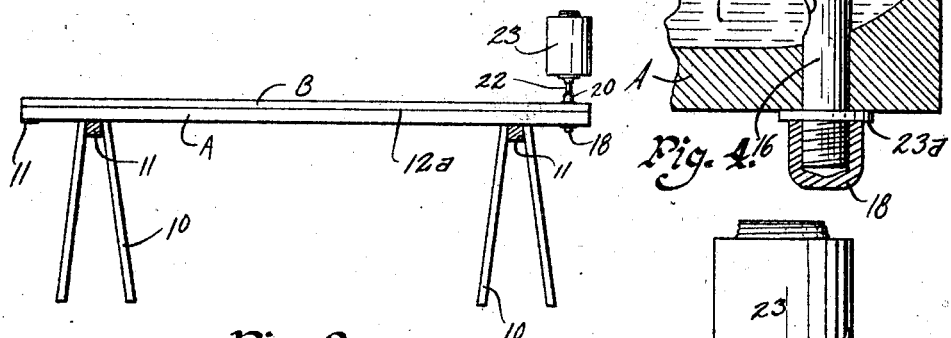
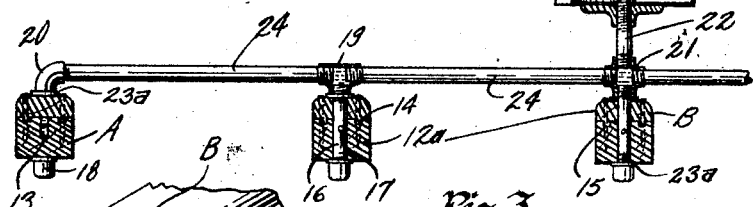
Witness
David Bair
Inventor
Lewis J. Kalvig
by Bair & Freeman Attorneys Patented June 14, 1927.

1,632,234

UNITED STATES PATENT OFFICE.

LEWIS J. KALVIG, OF KANAWHA, IOWA.

POULTRY ROOST.

Application filed December 9, 1925. Serial No. 74,318.

The object of my invention is to provide a poultry roost of simple durable and comparatively inexpensive construction.

More particularly my invention has to do with poultry roosts including a number of perch members each formed of two parts, one of the parts having a groove arranged therein for receiving insecticide, and coacting tongues and grooves on the two parts arranged on opposite sides of the groove adapted to contain the insecticide.

Still a further object is to provide a poultry roost wherein insecticide may flow by gravity from a supply tank to the perch members and be distributed evenly over the perch members.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 is a top plan view of my poultry roost showing several perch members.

Figure 2 is a sectional view taken on line 2—2 of Figure 1.

Figure 3 is a detail sectional view taken on line 3—3 of Figure 1 showing the supply tank for the insecticide.

Figure 4 is a detail sectional view taken on line 4—4 of Figure 1 showing one of the perch members and the connection between the supply tank and the insecticide groove or trough; and Figure 5 is an enlarged sectional view through one of the perch members.

In the accompanying drawings I have used the reference numeral 10 to indicate generally a pair of supports or horses, upon which I mount a pair of cross members 11 supported by a wall 12 or any other suitable support in a poultry house.

The cross members 11 have placed thereon a number of poultry perches 12ª. The perches 12ª are formed of two parts A and B. The part A is comparatively thicker than the part B and is formed with a groove 13 extending substantially from end to end of the part A.

The groove 13 does not, however, extend to the extreme ends of the part A and in this respect Figure 4 clearly shows the groove 13 as terminating short of the end of the part A.

The part B is placed upon the upper surface of the member or part A and has a pair of tongues 14 which extend into grooves 15 formed in the member 14, part A.

The coacting tongues and grooves 14 and 15 are positioned on opposite sides of the insecticide groove 13.

When the parts are assembled, that is the part B placed upon the part A, they are nailed or otherwise secured together.

It will be noted that the coacting tongues and grooves are arranged on the opposite sides of the channel or groove 13 and this is of importance when insecticide is permitted to flow within the groove or channel 13.

The perches 12ª have extended therethrough short pipes 16 which have openings 17 therein in communication with the insecticide groove 13.

A cap or closure 18 is mounted on the lower end of each of the short pipes 16. A T fitting 19 is secured to the upper end of each of the pipes 16 with the exception of the end pipes which have connected to them elbow fittings 20.

A four-way fitting 21 is connected to one of the pipes 16 wherein a second pipe 22 may be secured thereto upon which is mounted a supply tank or reservoir 23.

Washers 23ª preferably of leather, are placed under the caps 18, T's 19, elbows 20 and the cross 21.

The fittings 19, 20 and 21 are connected together by short supply pipes 24 wherein communication may be had from the supply tank 23 to the short pipes 16 and thence with the insecticide groove 13 in each of the perch members 12.

The supply tank 23 may be filled with insecticide and due to its position above the perch members, the insecticide will be permitted to flow by gravity into the grooves 13 and as it is absorbed will continue to flow into the grooves 13.

The insecticide will thoroughly disinfect the perch members by the fumes from the insecticide as well as the saturation of the insecticide into the perch part B.

The perch part A may be dipped in a wood filler or otherwise rendered oil proof so that the insecticide will not saturate it but will only saturate the part B.

Some changes may be made in the construction and arrangement of the various parts of my improved poultry roost without departing from the real spirit and purpose of my invention, and it is my intention to cover by my claims, any use of mechanical equivalents or modifications in structure which may be reasonably included within their scope.

I claim as my invention:

1. A poultry roost comprising a plurality of perch members, pipes for supplying insecticide to the perch members by gravity, a supply tank for the insecticide, each perch member formed of two interfitting members, one of said members having a groove therein for receiving the insecticide, both of said members having coacting parts on their adjacent abutting surfaces along each side of the groove, means for connecting said pipes to said perch members, said means comprising openings through the perch members, said pipes extending through the openings and clamped to the members, openings in said pipes for supplying said insecticide to said grooves.

2. A poultry roost comprising a plurality of spaced perch members, each perch member formed of two interfitting parts, one of said parts having a groove in its upper surface for receiving insecticide, the other of said parts being arranged to cover said groove, a supply pipe extending above the several perch members, stub pipes at right angles to the supply pipe and each extending through a perch member and in communication with the groove therein, a supply tank above said supply pipe for containing insecticide whereby the supply of insecticide will flow to the grooves in said perch members by gravity and means screwed on to said stub pipes on either side of said roost members for clamping the parts of the roost members together and sealing the stub pipes relative to the roost members.

LEWIS J. KALVIG.